US006092751A

United States Patent [19]

Kottmann

[11] Patent Number: 6,092,751

[45] Date of Patent: Jul. 25, 2000

[54] COMMINUTING APPARATUS

[75] Inventor: Norbert Kottmann, Schenk-Lengsfeld, Germany

[73] Assignee: Eurec Technology GmbH, Germany

[21] Appl. No.: 09/208,315

[22] Filed: Dec. 9, 1998

[30] Foreign Application Priority Data

Oct. 21, 1998 [DE] Germany ........................... 198 47 886

[51] Int. Cl.$^{7}$ ...................................................... H02C 18/18

[52] U.S. Cl. ............................................. 241/166; 241/236

[58] Field of Search ..................................... 241/236, 166, 241/167

[56] References Cited

U.S. PATENT DOCUMENTS 5,201,475 4/1993 Nakagomi ............................... 241/236
5,409,171 4/1995 Stangenberg et al. .................. 241/236
5,516,050 5/1996 Yamamoto et al. .................... 241/236

*Primary Examiner*—Mark Rosenbaum
*Attorney, Agent, or Firm*—Gabriel P. Katona L.L.P.

[57] ABSTRACT

A comminuting apparatus has a housing and a crushing area. The housing includes left and right bearing plates, left and right reinforcing, bearing and holdback plates, each with clearing and crushing prongs. The crushing unit includes left and right crushing shafts which are rotationally supported by the housing are interconnected to rotate in opposite directions, synchronously. Each crushing shaft includes a number of radially-extending tool carriers having tool heads which carry clearing devices and front and rear wear inserts, in seats within the tool heads. The crushing unit can be configured to provide clearing spacing between adjacent clearing devices of adjacent tool carriers, or to provide an overlap thereof. The clearing and crushing prongs are arranged between each of the tool carriers. An intermediate crushing area is formed between the left and right crushing shafts. The tool carriers can include relatively high and low tool heads to provide differing peripheral rates of rotation for the tools which define inner and outer spheres of actions.

22 Claims, 5 Drawing Sheets

COMMINUTING APPARATUS

FIELD OF THE INVENTION

The invention concerns a comminuting apparatus for wood, refuse and other breakable, tearable or workable waste.

BACKGROUND

Slowly running crushing devices or crushing plants with 2 parallel tool shafts that have disk-like tool carriers with mounted or installed crushing tools, are known from the prior art.

The crushing devices or crushing installations of this type have numerous drawbacks, because they primarily crush or comminute the material in only one operating direction of rotation of the crushing shafts and thus only in a single working range and, especially during the crushing of refuse, are only cleared from adhered materials during the reversal of rotation. A mode of operation of this type results in that a relatively large amount of material becomes compressed between the shafts which, in turn, negatively affects the feeding characteristics of the crushing devices, reduces the throughput and negatively affects the power input required for crushing the material.

BRIEF DESCRIPTION

The object of the invention is a crushing unit of the aforementioned type that reduces and eliminates the disadvantages of the prior art, has a simple structure and has a low technological demand and space requirement, whereby the routine expenditures during practical use are low. The novel crushing unit preferably has 3 crushing areas and can operate in either direction of rotation of the tool shafts during crushing or tearing or reduction of the volume during working of non-breakable or non-tearable materials. The novel crushing unit is thus in the form of a reciprocating unit and is useful for various crushings. More particularly, an object of the invention is to provide a crushing unit that can optionally carry out two different methods of operation corresponding to the properties of the material to be crushed.

These objects are met by the present invention, wherein the communicating apparatus has a housing and a crushing area therein, and wherein the housing contains a left bearing plate, a right bearing plate, a left reinforcing, supporting and holdback plate with clearing and crushing prongs and a right reinforcing, supporting and holdback plate with clearing and crushing prongs. The housing has a bearing area and a coupling area, the bearing area has a support and a right bearing, and the coupling area has a left outer coupling part and a right outer coupling part, both being attached to the crushing shafts. The crushing unit has a left crushing shaft and a right crushing shaft, the left and right clearing and crushing prongs, whereby the left crushing shaft is accommodated by the left fixed bearing and has a left outer coupling half that is accommodated by a left coupling pin, and the right crushing shaft is accommodated by the right fixed bearing, and has a right outer coupling half that is accommodated by a right coupling pin, and tool carriers sit on the crushing shafts and have tool heads that in turn have clearing devices in clearing seats, front wear inserts in front insert seats and rear wear inserts in rear insert seats.

BRIEF DESCRIPTION OF THE DRAWING

The invention is described in greater detail with reference being had to the attached drawing, in which.

DETAILED DESCRIPTION OF THE INVENTION

As shown in FIGS. 1–4, the crushing unit 1 (or comminuting apparatus) of the present includes left and right crushing shafts 3, 4 rotationally supported by a housing 2. The crushing shafts 3, 4 carry a number of tool carriers 13 (e.g., 3–10) which extend radially outwardly from the shafts 3, 4.

Figure 1:
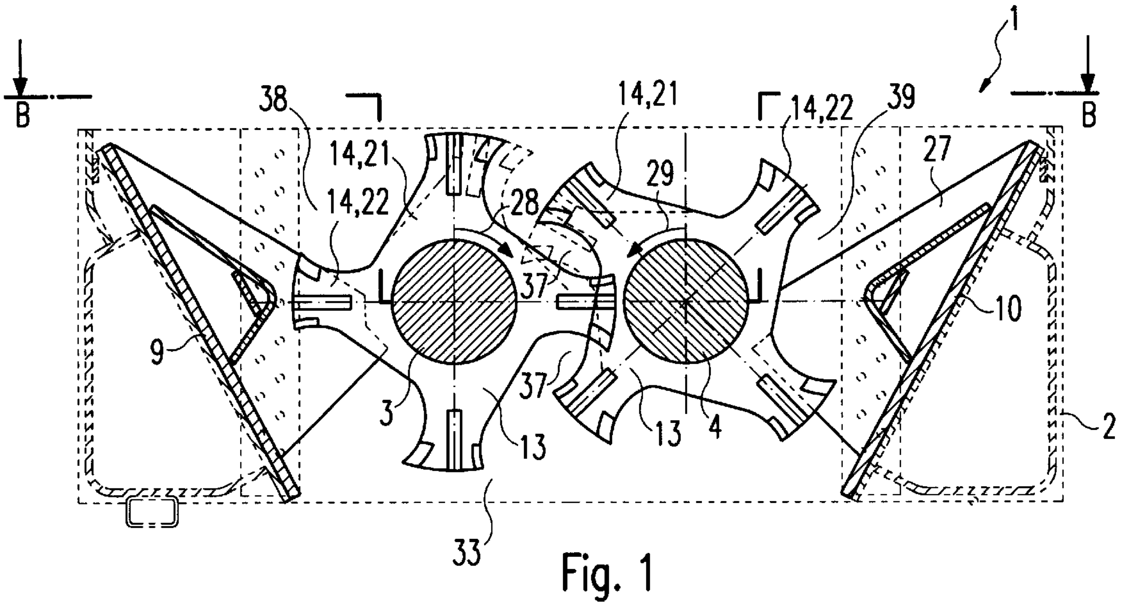
FIG. 1 is a cross-sectional view of a complete arrangement of the comminuting apparatus of the present invention, in a front view looking from the section A—A in FIG. 2.

The shafts 3, 4 are interconnected to synchronously rotate in opposite directions, and the crushing unit 1 is operable in two modes whereby in one mode material is drawn between the two shafts, and in the other mode, material is drawn between each shaft and the outside walls of the housing. The left and right crushing shafts 3, 4 are rotationally supported by left and right fixed bearings 5, 6 and left and right coupling members 7, 8, which coupling members are accommodated by left and right coupling pins 42, 43. The shafts 3, 4 are interconnected to rotate in opposite directions as depicted in FIG. 1.

Preferably, the crushing unit 1 is operated such that the rotational rate of the crushing shafts 3, 4 is between 0 and 60 revolutions per minute and most suitably between 0 and 30 revolutions per minute. It can be appreciated that the throughput of the crushing unit 1 (and the crushing burr) can be regulated by adjusting the rotational rate of the shafts 3, 4.

Figure 2:
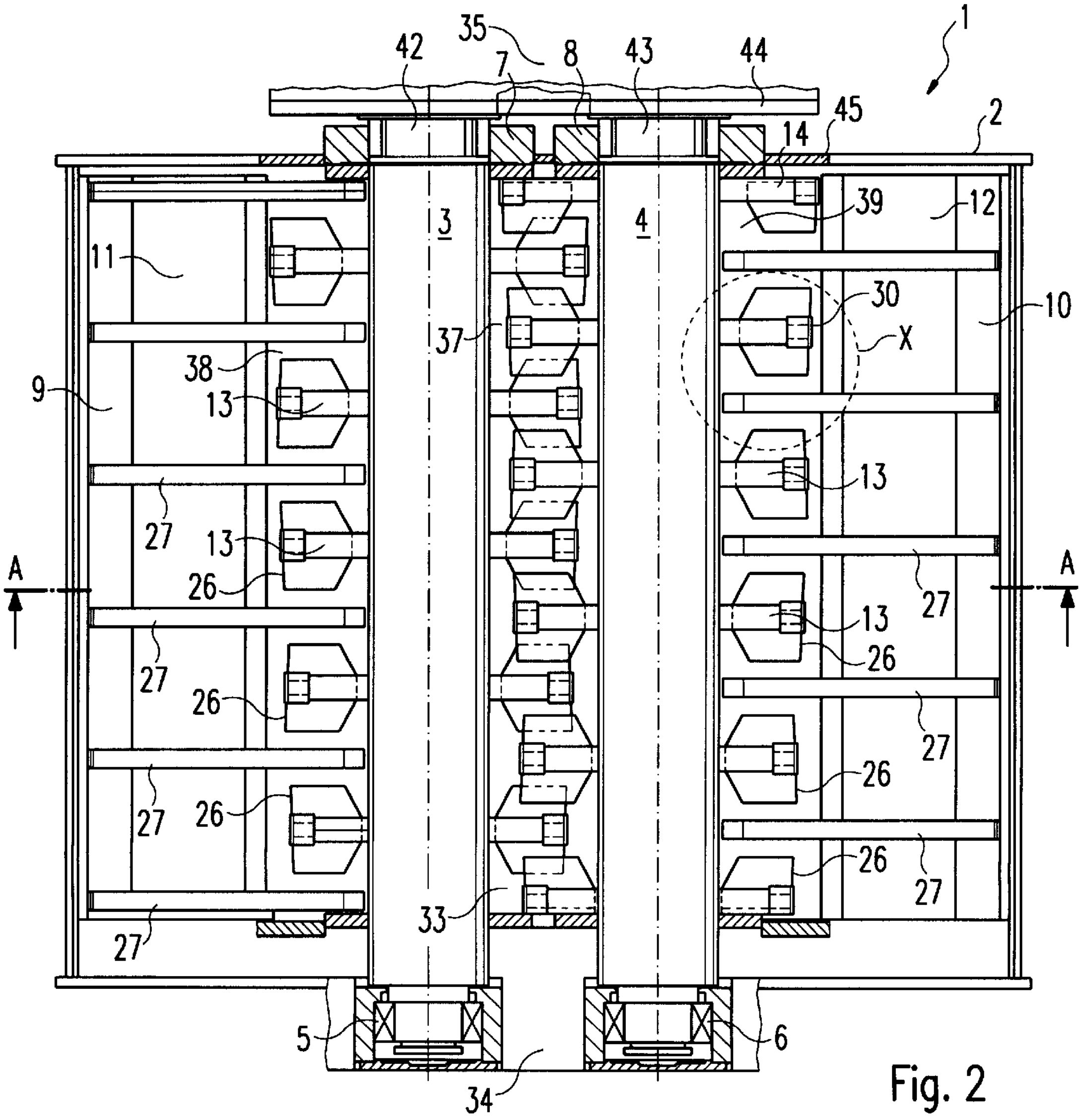
FIG. 2 is a plan view of the apparatus in the direction B—B in FIG. 1.
Figure 3:
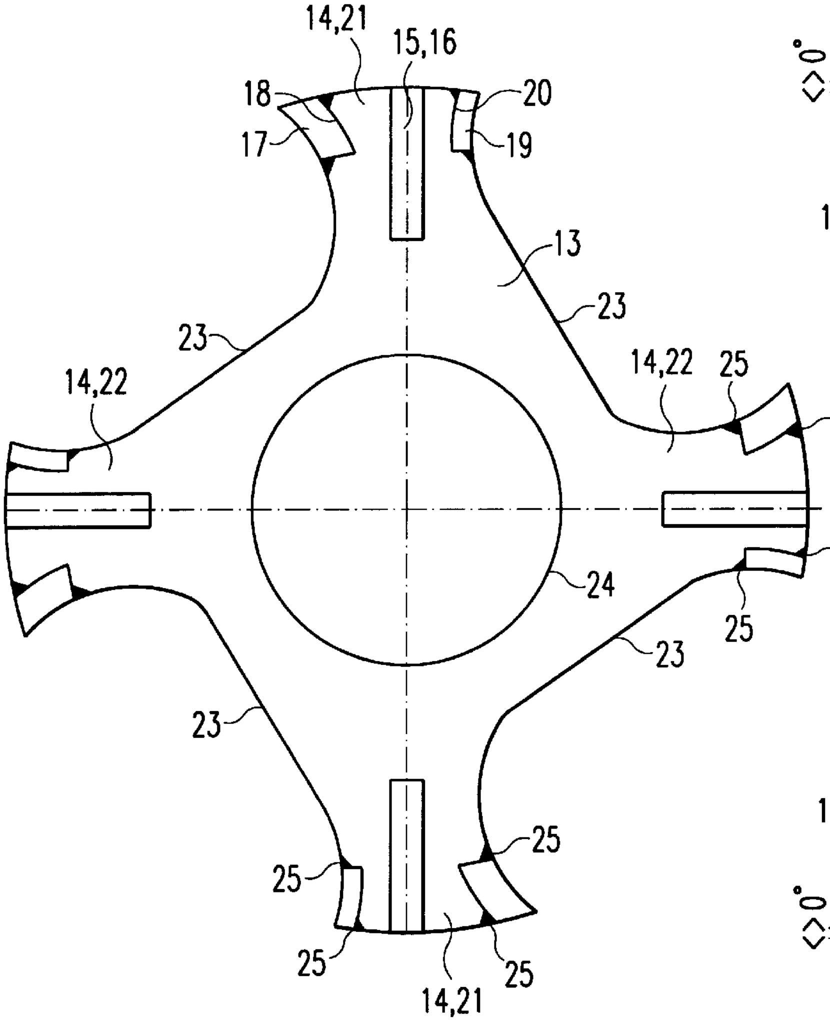
FIG. 3 is a schematic side elevation of a tool carrier.
Figure 4:
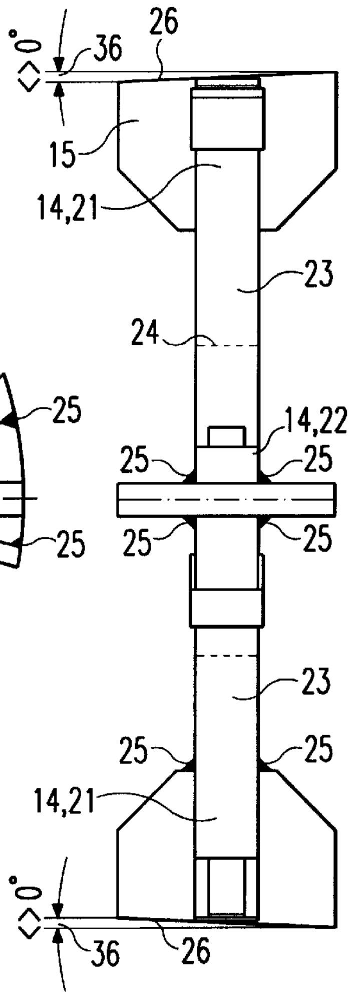
FIG. 4 is a schematic front elevation of the tool carrier of FIG. 3.

Each tool carrier 13 includes a number of tool heads (21, 22) each of which supports a front and rear wear insert 17, 18, and supports a clearing device 15. As shown in FIGS. 2 and 4, the clearing devices 15 are aligned substantially perpendicular to the tool carriers 13 and extend outwardly from the tool carriers 13 in a direction substantially parallel to the longitudinal axes of the crushing shafts 3, 4.

Figure 5:
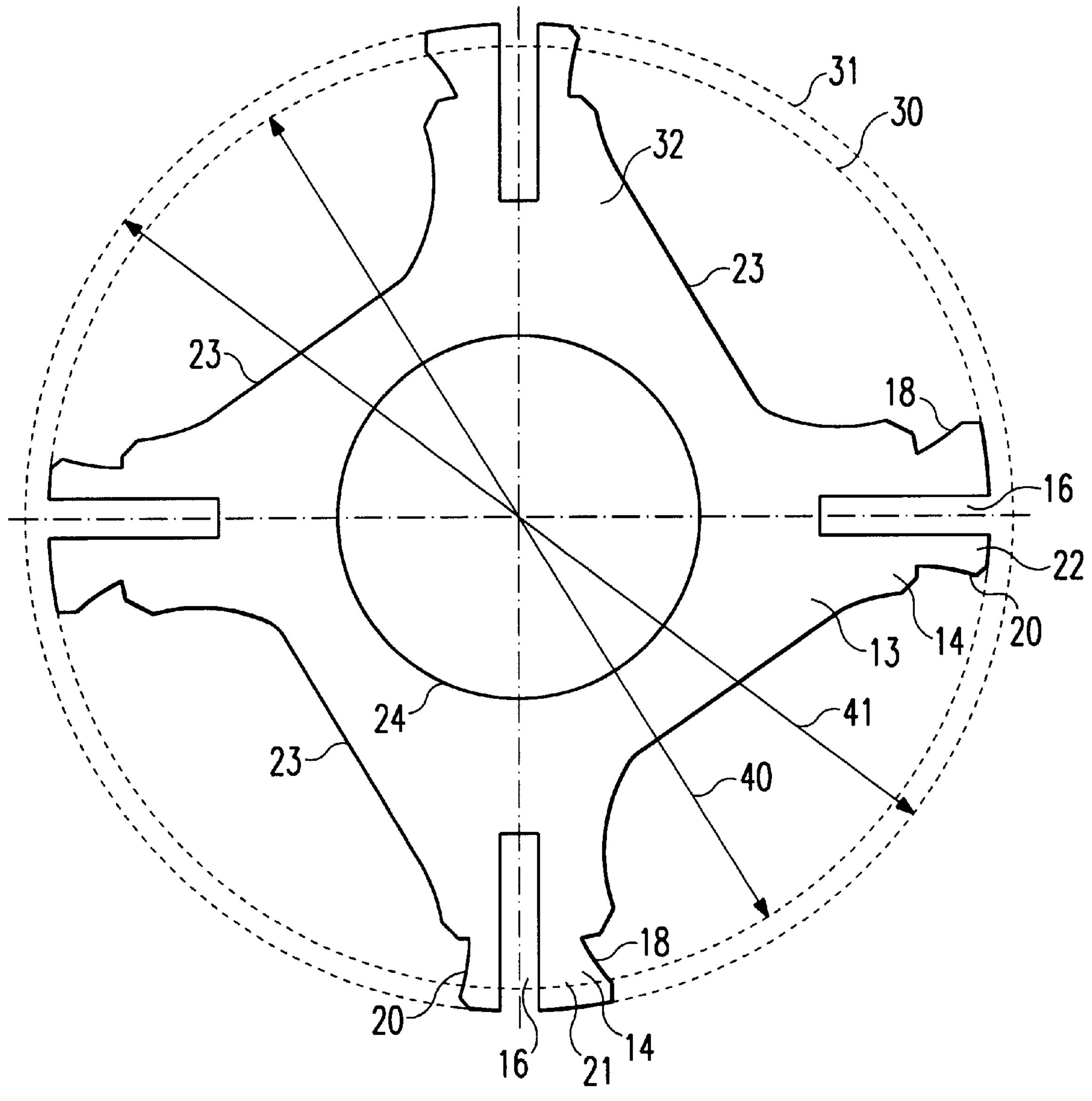
FIG. 5 is a schematic front elevation of the tool carrier as an unfinished part, in a front view.
Figure 6:
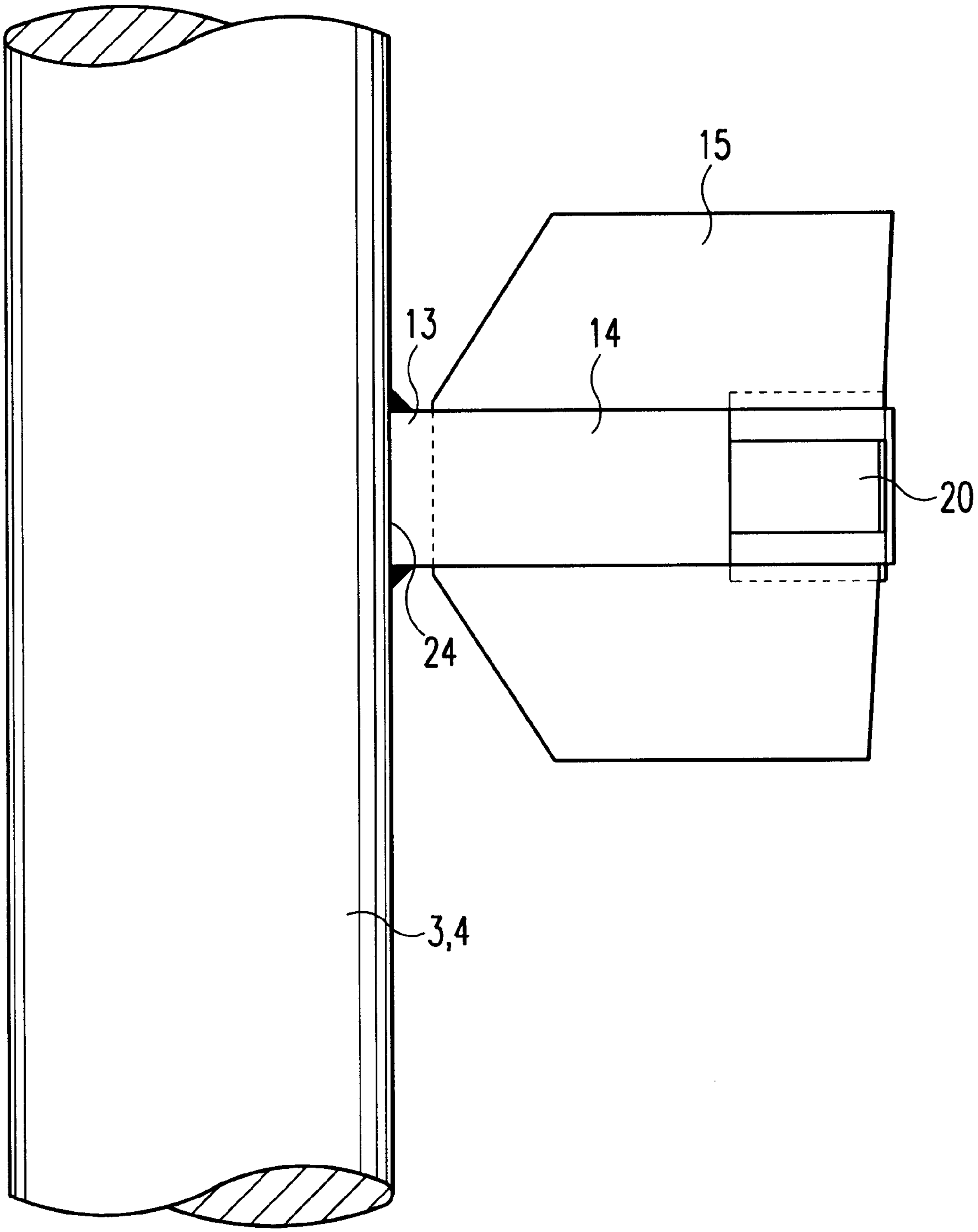
FIG. 6 is a schematic detail of the complete tool carrier arrangment as a detail X from FIG. 1.

As best seen in FIG. 5, each heads 21, 22 of the tool carriers 13 includes a clearing seat 16 for receiving a clearing tool 15, and front and rear wear insert seats 18, 19, for receiving the front and rear wear inserts, respectively.

The heads of the tool carriers 13 can have different radial heights such that for example a relatively high tool 21 is followed, angularly by a relatively low tool head 22. The clearing devices 15 do not exceed the radial height of the tool heads 21, 22 such that the low and high tool heads 21, 22 of a rotating tool carrier 13 create inner and outer spheres of action 30, 31, also indicated as inside and outside active diameters 40, 41. Preferably, the radial difference between the inside and outside diameters 40, 41 is greater than 1 mm to provide a certain amount of variance in the peripheral speeds of high and low tool heads to provide desirable tearing to the work material.

As shown in FIG. 4, the clearing tool 13 preferably has a clearing bevel 26 on the radially outside surface thereof. The clearing bevel 26 preferably forms a clearing angle 36 which is not equal to zero. The clearing devices can be comprised of impact-resistant material and can be fastened to the tool carrier by any suitable method such as welding, screwing or pinning. Also, the clearing devices 15 preferably do not have any knife-shaped or wedge-shaped formations.

The housing 2 includes left and right bearing plates 9, 10, left and right bearing and holdback plates 11, 12, and left and right clearing and crushing prongs 27. The left and right bearing plates 9, 10 are inclined downwardly and inwardly toward the crushing shafts 3, 4. The left and right clearing and crushing prongs 27 extend inwardly from the bearing panels 9, 10 to between adjacent tool carriers 13 and between the clearing devices 15 attached thereto. The left and right bearing and holdback plates extend inwardly from the left and right bearing plates 9, 10, between the clearing and crushing prongs 27.

The crushing unit 2 has a crushing area 33 which is divided into left and right crushing areas 38, 39, and an intermediate crushing area 37. The intermediate crushing area 37 is defined by the left and right crushing shafts 3, 4. Material is comminuted in the intermediate crushing area 37 when the crushing unit 1 is operated in a first mode wherein the left and right shafts 3, 4 rotate in opposite, inward directions of rotation 28, 29 (as depicted in FIG. 1).

The left crushing area 38 is defined by the left crushing shafts and the left bearing plate, left bearing and clearing plate 11 and the left clearing and crushing prongs 27. The right crushing area 39 is defined in a similar manner.

Material is comminuted in the left and right crushing areas 38, 39 when the crushing unit 1 is operated in a second mode wherein the left and right shafts rotate in opposite outward directions of rotation. (reverse of FIG. 1).

As shown in FIG. 1, the crushing unit 1 can be configured such that a clearing space 46 exists between adjacent portions of clearing devices 15 of adjacent tool carriers 13. Alternatively, as shown in FIG. 1, the crushing unit 1 can be configured such that adjacent clearing devices 15 overlap.

Figure 7:
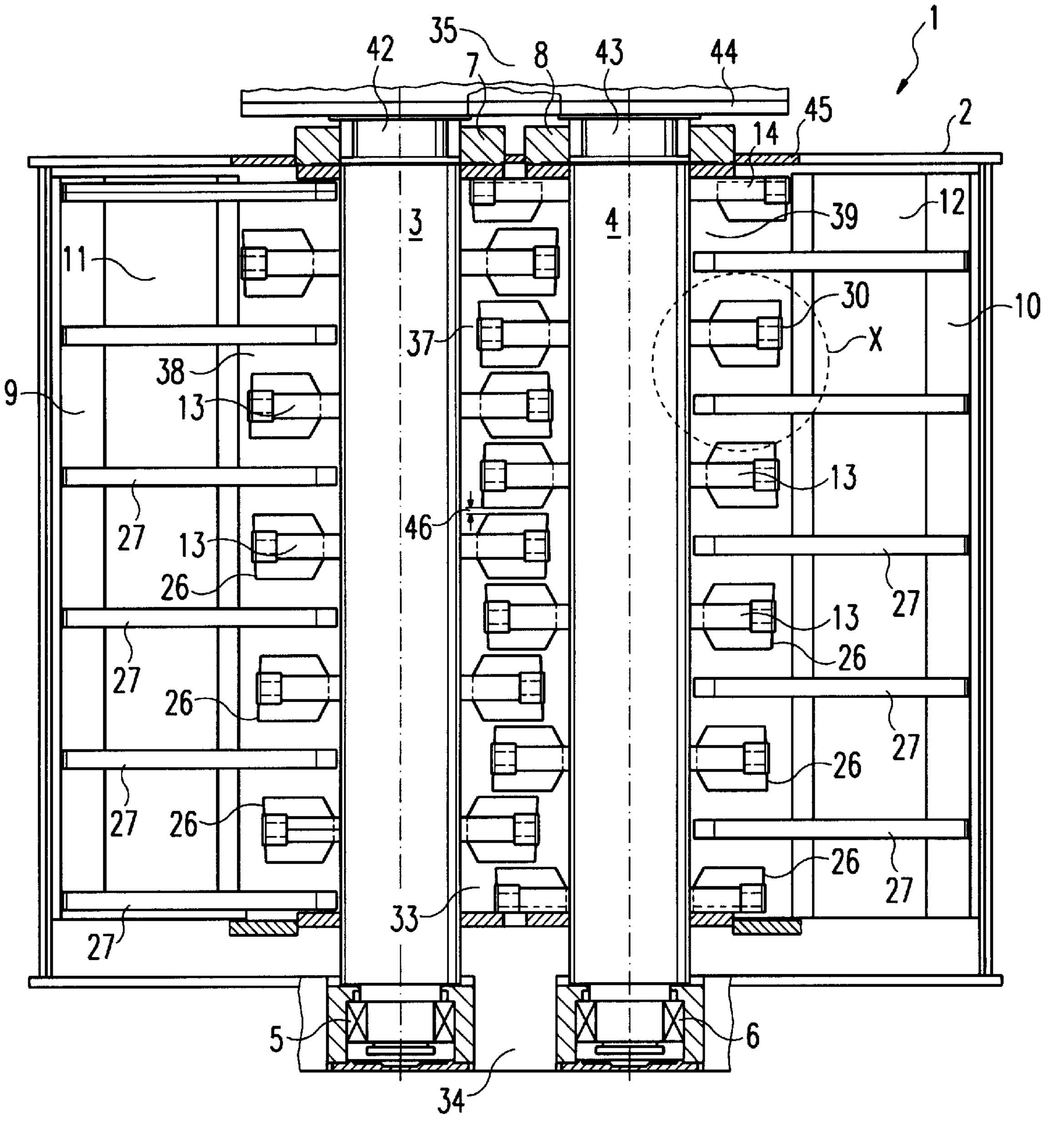
FIG. 7 is another plan view of the apparatus along the section B—B in FIG. 1, showing clearing spacings.

As seen in FIGS. 2 and 7, the tool carriers 13 of the left and right crushing shafts 3, 4 are arranged in interleaved fashion such that the clearance between adjacent tool carriers 13 in the intermediate crushing area 37 is less than the clearance between the tool carriers 13 and the adjacent clearing and crushing prongs 27 in the left and right crushing areas 38, 39. Thus, it can be appreciated that the crushing unit 1 can be operated to produce different comminution characteristics simply by operating the crushing unit 1 in one of the two modes of operation discussed above, without adjusting or changing the configuration of any of the components of the crushing unit 1.

What is claimed is:

1. A comminuting apparatus comprising a housing (2) and a crushing area (33), the housing (2) including a left bearing plate (9), a right bearing plate (10), a left reinforcing, bearing and holdback plate (11) with clearing and crushing prongs (27) and a right reinforcing, bearing and holdback plate (12) with clearing and crushing prongs (27) and comprising a left crushing shaft (3) and a right crushing shaft (4), each rotationally supported by the housing (2), each crushing shaft (3, 4) including a number of the tool carriers having tool heads (14) which have clearing devices (15) in clearing seats (16), front wear inserts (17) in front wear insert seats (18) and rear wear inserts (19) in rear wear insert seats (20).

2. Comminuting apparatus according to claim 1, wherein the left crushing shaft (3) is equipped with 3, 4, 5, 6, 7, 8, 9 or 10 tool carriers (13) and the right crushing shaft (4) with 3, 4, 5, 6, 7, 8, 9 or 10 tool carriers (13).

3. Comminuting apparatus according to claim 1, wherein a tool carrier (13) has 2, 3, 4, 5, 6, 7 or 8 tool heads (14) whereby the number of tool heads (14) also determine the grain size of the output.

4. Comminuting apparatus according to claim 1, wherein a clearing and crushing prong (27) is arranged between each of the tool carriers (13) in the left crushing area (38).

5. Comminuting apparatus according to claim 1, wherein a clearing and crushing prong (27) is arranged between each of the tool carriers (13) in the right crushing area (39).

6. Comminuting apparatus according to claim 1, wherein an intermediate crushing area (37), formed by the left crushing shaft (3) and the right crushing shaft (4), is located in the crushing area (33), [whereby] the left crushing shaft (3) crushes in the operating direction of rotation (28) and the right crushing shaft (4) crushes in the opposite direction of rotation (29) and both shafts move synchronously in opposite direction.

7. Comminuting apparatus according to claim 1, wherein an intermediate crushing area (37), formed by the left crushing shaft (3) and the right crushing shaft (4), is located in the crushing area (33), the left crushing shaft (3) crushes in the operating direction of rotation (28) and the right crushing shaft (4) crushes in the opposite direction of rotation (29), a clearing spacing (46) is formed between the clearing devices (15) of the left crushing shaft (3) and the clearing devices (15) of the right crushing shaft (4) and both shafts move synchronously in opposite direction.

8. Comminuting apparatus according to claim 1, wherein a left crushing area (38) is formed in the crushing area (33) and the left crushing area (38) comprises the left crushing shaft (3) with tool carriers (13) and clearing devices and crushers, with the left bearing plate (9), the left reinforcing, bearing and holdback plate (11) as well as the left clearing and crushing prongs (27), the clearing and crushing prongs (27) extend between the tool carriers (13).

9. Comminuting apparatus according to claim 1, wherein a right crushing area (39) is formed in the crushing area (33) and the right crushing area (39) comprises the right crushing shaft (4) with tool carriers (13) and clearing devices and crushers, with the right bearing plate (10), the right reinforcing, bearing and holdback plate (12) as well as the right clearing and crushing prongs (27), the clearing and crushing prongs (27) extend between the tool carriers (13).

10. Comminuting apparatus according to claim 1, wherein the width of the clearing and crushing prongs (27) is variable and that, with a low number of tool carriers (13) per crushing shaft (3 and 4), with an operating direction of rotation of the shafts in opposite directions (28) in the left and right crushing area (38 and 39), a different grain size of the output is obtained than in the intermediate crushing area (37), that is that the grain size and throughput capacity are determined by the selection of the operational direction of rotation of the crushing shafts (3 and 4) without changing the crushing shafts (3 and 4) and the clearing devices and crushers.

11. Comminuting apparatus according to claim 1, wherein a clearing angle (36) is not equal to 0°.

12. Comminuting apparatus according to claim 1, wherein clearing devices (15) consist of an impact-resistant material.

13. Comminuting apparatus according to claim 1, wherein the clearing device (15) is fastened to the tool carrier (13) by welding, screwing or pinning.

14. Comminuting apparatus according to claim 1, wherein the front wear insert (17) and the rear wear insert (19) consist of an impact-resistant material.

15. Comminuting apparatus according to claim 1, wherein the difference between an inside active diameter (40) and an outside active diameter (41) is greater than 1 millimeter thereby providing desirable tearing behavior due to the varying peripheral speed of the tool heads (14).

16. Comminuting apparatus according to claim 1, wherein the tool carrier (13) has a high tool head (21) and one or more low tool heads (22).

17. Comminuting apparatus according to claim 1, wherein the tool carrier (13) can have one or more high tool heads (21) and one or more low tool heads (22) in any order desired.

18. Comminuting apparatus according to claim 1, wherein the rotational speed of the left crushing shaft (3) and the right crushing shaft (4) is between 0 and 60 revolutions/minute whereby a continuous flow of material is ensured.

19. Comminuting apparatus according to claim 1, wherein the throughput of the crushing unit can be regulated according to the desired throughput quantity by means of the variable speed.

20. Comminuting apparatus according to claim 1, wherein a crushing burr is determined by the speed selection.

21. Comminuting apparatus according to claim 1, wherein the clearing devices (15) fastened in the high tool heads (21) do not exceed the outer sphere of action (31) and wherein the clearing devices (15) fastened in the low tool heads (22) do not exceed the inner sphere of action (30).

22. Comminuting apparatus according to claim 1, wherein the clearing devices (15) do not have any knife-shaped or wedge-shaped formations.

* * * * *